United States Patent Office 2,955,902
Patented Oct. 11, 1960

2,955,902
PROCESS FOR THE DYEING OF POLYESTER FIBERS

Ernest Merian, Bottmingen, near Basel, Switzerland, assignor to Sandoz A.G., Basel, Switzerland No Drawing. Filed June 1, 1959, Ser. No. 817,038
Claims priority, application Switzerland July 20, 1955

3 Claims. (Cl. 8—55)

Low molecular phthaloperinones are known. From aqueous dispersion they posses no affinity for secondary cellulose acetate and cellulose triacetate; it was therefore not to be expected that they would draw onto polyester fibers, all the more as even dyestuffs which are well suitable for acetate often possess only poor building-up properties on polyester fibers. It is also known that phthaloperinones can be converted by precipitation from sulfuric acid into preparation which dye synthetic polyamide fibers. Upon precipitation, however, dyestuffs are obtained which are water-soluble and chemically different from the starting products. They are suitable for dyeing synthetic polyamide fibers but they do not dye polyester fibers.

It has now been found that polyester fibers can be dyed from an aqueous dispersion of phthaloperinone converted into a finely divided form, to give an orange shade fast to light, gas fumes, sublimation and washing; wool, cotton and viscose rayon when present in the dyebath are reserved. The slight depth dyed onto wool is exceptionally fast to light whereas the light fastness of known polyester dyes on wool is poor.

This property has assumed great importance with the growing popularity of blends of polyester fibers with other fibers, notably wool. When polyester fiber-wool blends are dyed with disperse dyestuffs a substantial amount of the dyestuff is absorbed and retained by the wool; such wool dyeings are not fast and consequently the commercial value of the goods is reduced. There are no orange disperse dyestuffs commercially available which give sufficiently good reserve of wool. The use of phthaloperinone in very fine aqueous dispersion makes it possible to obtain vivid orange dyeings on polyester fibers, whereas wool, cotton or viscose are reserved in blended fabrics.

The use of phthaloperinone and its derivatives as pigment dyestuffs, e.g. for the dyeing of molten masses of polyesters, is already known. But it could not be expected that phthaloperinone would be suitable as a disperse dyestuff for dyeing polyester fibers from aqueous dispersions, since the phthaloperinone dyestuffs utilizable as pigment dyestuffs are to a large extent unsuitable as disperse dyestuffs; for example: 11,12,13,14-tetrachlorophthaloperinone and the dyestuff obtained by condensing 1 mole of naphthalene-1.4.5.8-tetracarboxylic acid anhydride with 2 moles of 1.8-diaminonaphthalene are fully unsuitable for dyeing polyester fibers from aqueous dispersions whereas they yield very good results in the dyeing in the mass of polyester melts.

The dyeing of polyester fibers from aqueous dispersions presents big advantages over the dyeing in the bulk. Especially it is possible for the dyer to shade when using white polyester fibers and dispersed water-insoluble dyestuffs. Bulk-dyeing is always done for big stocks whereas the consumer often likes to get a particular shade in short times. This task can only be fulfilled when it is possible to dye white polyester fibers with dispersed water-insoluble dyestuffs, and unexpectedly phthaloperinone in finely divided form is excellently suitable for that purpose. Phthaloperinone corresponds to the formula

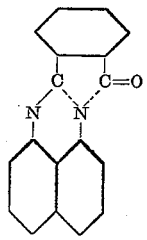

The expression polyester fibers refers more particularly to condensation products of terephthalic acid and ethylene glycol such as are commercially available under the registered trademarks Dacron, Terylene, Trevira and Diolen.

Phthaloperinone is converted into finely divided form by dissolving the technical product in an organic solvent miscible with water, if desired at elevated temperature, and introducing the resulting solution into water, upon which the product is filtered off, washed, and kneaded with a dispersing agent. The paste thus obtained may be subsequently dried at normal or reduced pressure or by means of a spray drier. A further mode of converting phthaloperinone into a finely divided form consists in reducing the size of the technical phthaloperinone in the dry or moist state by grinding and/or kneading in presence of dispersing agents and, if desired, of filling agents and/or grinding assistants. The grinding operation may be followed by one of the drying operations customary in the production of pigments. The dyeing preparations thus obtained contain the phthaloperinone in particles of the order of magnitude of 1 micron.

The polyester fibers are dyed by the known methods in presence of carriers at 80°–100° C. or in balance of carriers at 100°–140° C. under pressure.

In both dyeing processes additions of dispersing agents, such as soap, the dry residue of sulfite waste liquor, sodium dinaphthylmethanedisulfonate, Turkey red oil, sodium cetyl sulfate, sodium lauryl sulfate, sodium oleoyloxyethanesulfonate, sodium oleoylaminoethanesulfonate, sodium N-methyl-N-oleoylaminoethanesulfonate or the condensation products of fatty alcohols or alkylphenols with ethylene oxide, have a beneficial effect.

The following examples show how the present process can be carried out. They are, however, by no means limitative as regards the choice of starting materials and the operating conditions. All parts refer to parts by weight, the temperatures are given in degrees centigrade, and the melting points are uncorrected.

*Example 1*

40 parts of phthaloperinone (melting point 228–230°), 40 parts of sodium lauryl sulfate and 20 parts of sodium sulfate are ground in a roller mill for 48 hours. 2 parts of the fine orange powder thus obtained are pasted with a little cold, soft water. More cold, soft water is poured into the paste, and the resulting suspension is stirred well and added through a sieve to a dyebath consisting of 2 parts of sodium lauryl sulfate and 4000 parts of water.

100 parts of a fabric of "Dacron" (registered trademark) polyester fiber are brought into the dyebath at 40–50°. The temperature is slowly increased to 95–100° and the material dyed for 1 to 2 hours at this temperature in presence of 20 parts of an emulsion of a chlorinated benzene in water.

The orange dyeing obtained is rinsed, treated for 15 minutes at 70° in a bath containing 2 parts of an alkylphenyl polyglycol ether in 4000 parts of water, rinsed again and dried. It is bright orange in shade and is outstandingly fast to light, water, sea water, washing, sublimation, gas fumes, dry and wet pressing, crocking, dry cleaning and hypochlorite bleaching. Cotton, viscose rayon and wool present in the dyebath are reserved, the former completely, the latter to a very considerable extent.

Example 2

75 parts of phthaloperinone are dissolved in 2000 parts of boiling pyridine. The hot solution is filtered free of minor impurities and the dark filtrate transferred rapidly to 4000 parts of water and 2000 parts of ice with vigorous stirring. The brilliant orange suspension thus formed is then filtered. The filtration residue is washed free of pyridine and kneaded with 150 parts of sodium lignin sulfonate to give a finely dispersed paste which is dried at 30° in a water jet vacuum and then ground carefully to give an orange preparation. 3 parts of this dyeing preparation is dispersed in 4000 parts of cold, soft water containing 3 parts of sodium N-methyl-N-oleoyl-aminoethanesulfonate. 100 parts of a scoured fabric of "Terylene" (registered trademark) polyester fiber are introduced into the dyebath at 40–50°, the temperature slowly increased to 120–130° and dyeing continued at this temperature for about 30 minutes under static pressure. The dyed fabric is rinsed, treated for 15 minutes at 60° in a solution of 1.5 parts of an alkylphenyl polyglycol ether in 3000 parts of water, rinsed again and dried.

The orange dyeing possesses the same fastness properties as the dyeing obtained according to Example 1.

Example 3

9.5 parts of phthaloperinone are dissolved in 2000 parts of boiling glacial acetic acid. The hot solution is filtered free of minor impurities and the filtrate transferred rapidly to 4000 parts of water and 3000 parts of ice with vigorous stirring. The brilliant orange suspension thus formed is filtered. The filtration residue is washed free of acetic acid and kneaded with 15 parts of sodium dinaphthylmethanedisulfonate. A finely dispersed paste is obtained which is subsequently spray-dried at 60°. The preparation is suitable for dyeing polyester fibers at 120° under pressure in orange shades in the same manner as described in Example 2.

Example 4

10 parts of phthaloperinone are ground in a ball mill with 10 parts of sodium dinaphthylmethanedisulfonate and 80 parts of water for 70 hours. 5 parts of the obtained paste are run into a dyebath consisting of 2000 parts of water and 5 parts of 2-hydroxy-1.1'-diphenyl. In this dyebath 100 parts of "Dacron" (registered trademark) polyester fiber are entered at 40–50°, dyed for 1 hour at the boil, removed from the dyeliquor, washed as described in Example 1, rinsed again and dried. The orange dyeing is well penetrated and possesses the same fastness properties as the dyeing produced according to Example 1.

The 5 parts of 2-hydroxy-1.1'-diphenyl can without disadvantage be replaced by 20 parts of methyl salicylate in emulsified form or by 15 parts of an emulsion of trichlorobenzene or tetrahydronaphthalene.

Example 5

40 parts of phthaloperinone, 20 parts of sodium sulforicinoleate and 40 parts of dextrin are ground in a ball mill for 48 hours. A fine powder is obtained which dyes polyester fibers at the boil in presence of a carrier, e.g. benzoic acid, or at 130° under pressure, giving orange shades which are fast to light and washing.

Example 6

40 parts of phthaloperinone, 20 parts of a protein hydrolyzate and 40 parts of carboxy methyl cellulose are ground in a roller mill for 48 hours. A fine powder is obtained which dyes polyester fibers at the boil in presence of a carrier, e.g. 1-hydroxy-2-phenylbenzene, or at 130° under pressure, the dyeings being orange in shade and fast to light and washing.

This application is a continuation-in-part of application Serial No. 595,129, filed July 2, 1956, and now abandoned.

Having thus disclosed the invention what I claim is:

1. A method of dyeing a polyethylene terephthalate fiber which comprises treating the fiber at a temperature of at least about 100° C. with an aqueous dispersion of phthaloperinone in finely divided form.

2. A method of dyeing a polyethylene terephthalate fiber according to claim 1, wherein the treatment is carried out at the boil and in the presence of a carrier.

3. Polyethylene terephthalate fibers containing, as coloring agent, finely divided phthaloperinone and having been dyed according to claim 1.

References Cited in the file of this patent

UNITED STATES PATENTS

| | | |
|---|---|---|
| 2,628,963 | Laucius | Feb. 17, 1953 |
| 2,670,263 | Luttringhaus | Feb. 23, 1954 |
| 2,687,940 | Sartori | Aug. 31, 1954 |
| 2,757,064 | Speck | July 31, 1956 |
| 2,782,187 | Sartori | Feb. 19, 1957 |
| 2,833,613 | Hallada | May 6, 1958 |
| 2,849,447 | Kartinos | Aug. 26, 1958 |

FOREIGN PATENTS

| | | |
|---|---|---|
| 1,075,110 | France | Oct. 13, 1954 |
| 730,692 | Great Britain | May 25, 1955 |

OTHER REFERENCES

J. of the Soc. of Dyers and Colourists, January 1954, pp. 13–15.

J. of the Soc. of Dyers and Colourists, December 1955, pp. 840–842.

UNITED STATES PATENT OFFICE
CERTIFICATION OF CORRECTION

Patent No. 2,955,902            October 11, 1960

Ernest Merian

It is hereby certified that error appears in the above numbered patent requiring correction and that the said Letters Patent should read as corrected below.

Column 1, line 23, for "preparation" read -- preparations --; column 2, lines 3 to 13, the formula should appear as shown below instead of as in the patent:

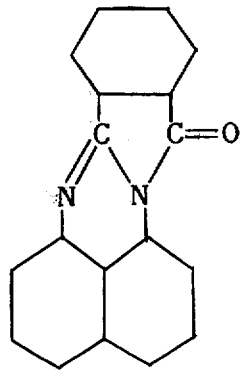

same column 2, line 36, for "balance" read -- absence --; column 3, line 37, for "knealed" read -- kneaded --.

Signed and sealed this 1st day of August 1961.

(SEAL)
Attest:

ERNEST W. SWIDER            DAVID L. LADD
Attesting Officer            Commissioner of Patents